United States Patent [19]

Hösel et al.

[11] Patent Number: 4,590,738
[45] Date of Patent: May 27, 1986

[54] APPARATUS FOR LOADING AND UNLOADING A FILM CASSETTE, IN PARTICULAR AN X-RAY FILM CASSETTE

[75] Inventors: Peter Hösel, Munich; Herbert Plaschke, Gernlinden, both of Fed. Rep. of Germany

[73] Assignee: Agfa-Gevaert AG, Leverkusen, Fed. Rep. of Germany

[21] Appl. No.: 527,307

[22] Filed: Aug. 29, 1983

[30] Foreign Application Priority Data

Aug. 30, 1982 [DE] Fed. Rep. of Germany ....... 3232187

[51] Int. Cl.⁴ ............................................. B65G 65/04
[52] U.S. Cl. .................................. 53/266 R; 414/404; 414/411
[58] Field of Search ................. 53/266, 244, 237, 238, 53/249, 504, 67, 381 R, 382, 540, 167; 221/23.1; 414/411, 404, 403; 271/9, 303, 238, 240

[56] References Cited

U.S. PATENT DOCUMENTS

| | | | |
|---|---|---|---|
| 3,150,263 | 9/1964 | Catlin | 53/266 C |
| 3,589,710 | 6/1971 | Yagi | 271/171 X |
| 4,049,142 | 9/1977 | Azzaroni | 414/411 X |
| 4,227,089 | 10/1980 | Plessers et al. | 53/266 C |

Primary Examiner—Horace M. Culver
Attorney, Agent, or Firm—Michael J. Striker

[57] ABSTRACT

An apparatus for loading and unloading of film cassette, in particular X-rays cassettes has a housing which defines a compartment in which the cassette is to be positioned, means for transporting the cassette into the compartment and for discharging therefrom, and means for removing the film from the cassette and loading the cassette with a new film. For recognizing the size of the cassette first and second identifying means are provided which determine the length and the width of the cassette. These determining means are in communication with comparing means which compare the determined values with nominal values corresponding to predetermined length-and-width values.

13 Claims, 5 Drawing Figures

4,590,738

APPARATUS FOR LOADING AND UNLOADING A FILM CASSETTE, IN PARTICULAR AN X-RAY FILM CASSETTE

BACKGROUND OF THE INVENTION

The invention relates to an apparatus for loading and unloading film cassettes and particularly X-ray film cassettes.

The German Offenlegungsschrift 26 07 876 discloses an apparatus provided with a compartment for receiving a cassette, transport means for introducing and discharging the cassette, means for light-tight closing of the cassette means for removing a respective film sheet from the cassette and for transferring the film sheet to a transport roller pair, means for loading a new film sheet into the cassette and a transverely moving shifting device for positioning the cassette and provided with a feeler device for determining the length of the cassette.

According to this reference, the cassette is moved in the compartment to a stop member and then is pushed transversely to the movement against a second lateral stop member by the shifting device. Consequently the cassette is fixed with an edge thereof as reference point.

The shifting device is provided with feelers which engage on one side of the cassette. Through abutment of the shifting device on the cassette, these feelers are actuated i.e. the actuated feelers transmit the information about the cassette length. This apparatus inherents, however, the disadvantage that the provision of a determination solely of the length is insufficient because only one dimension is recognized. Moreover, the apparatus does not allow to determine when a cassette is introduced in a reversed position or when turned about 90°.

SUMMARY OF THE INVENTION

It is a general object of the invention to avoid the prior art disadvantages.

In particular, it is an object of the invention to provide an apparatus for loading and unloading a film cassette which permits the determination of the cassette size as well as the position of the cassette in an accurate manner.

In keeping with these objects and with others which will become apparent hereinafter, one feature of the invention resides in an apparatus for loading and unloading a film cassette, in particular a X-ray cassette, comprising a house defining a compartment and including a front face having an opening to the compartment through which opening the cassette is introduced, means for transporting the cassette into the compartment and for discharging the cassette from the compartment, first means for identifying the length of the cassette for providing a corresponding actual value thereof, second means for identifying the width of the cassette for providing a corresponding actual value thereof, means for comparing the actual values of the first and second identifying means with stored nominal values of concrete sizes of cassettes, and means for removing the film from the cassette and loading the cassette with a new film.

The comparing means are provided with a computer to which the determined size of the cassette is transmitted and which compares the transmitted value with a nominal value stored in a memory. Depending on the outcome of this comparison the cassette is discharged from the apparatus or released for further processing. The first identifying means includes a controller drum which is located within the compartment parallel to the opening and is actuated when a cassette is introduced into the compartment. In case the cassette has a too long size, the cassette is caused to be discharged through the computer. Otherwise a shifting device is actuated within the compartment and which cooperates with a first plurality of light barriers and a lug of the first identifying means and with a sensing unit, a second plurality of light barriers and a further lug of the second identifying means in order to determine the length and the width of the cassette.

According to another feature of the invention, the apparatus comprises third identifying means which permit the determination of the position of the cassette in the compartment and include a traced pin which is engageable with only one respective recess in the cassette. When the tracer pin can engage in this recess, the cassette has the correct position otherwise the cassette is caused to be discharged through the computer.

Through the provision of the apparatus according to the invention, the cassette size is determined according to the respective length and width and additionally an incorrect position of the cassette in the compartment is recognized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
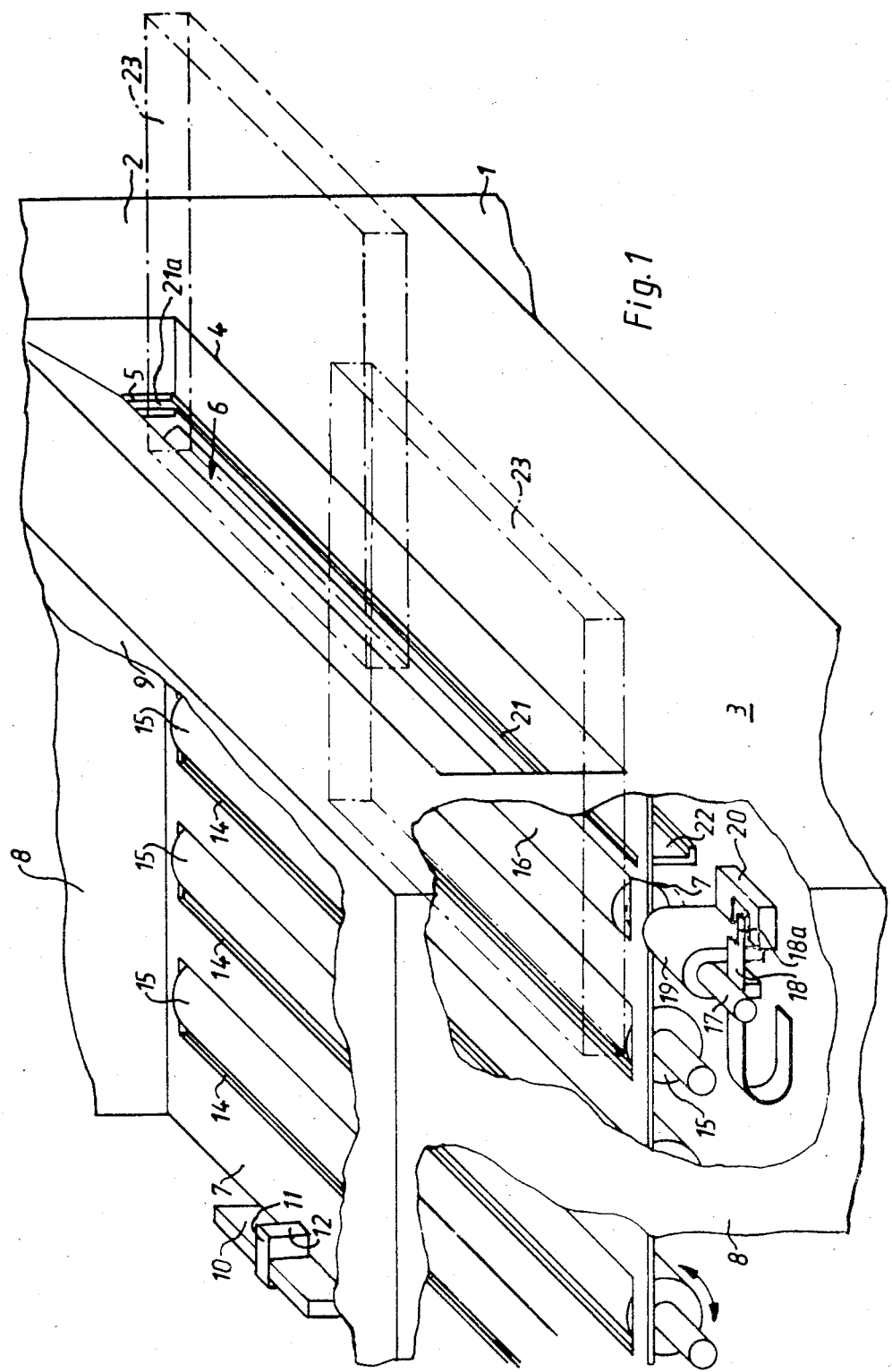
FIG. 1 is a perspective, partially sectioned view of a cassette feeding station of an apparatus for loading and unloading X-ray film cassettes.

In FIG. 1, there is shown an apparatus for loading and unloading an X-ray cassette having a housing 1 in which a cassette station 2 is located. The housing 1 has a front cover 3 provided with a recess 4 from which inclined planes extend to an input opening 5 which has a height and a width corresponding to the widest and largest cassette size. Extending from the input opening 5 is a compartment 6 which essentially is defined by a bottom 7, side walls 8, and a cover wall 9 and is open to the rear. The rearward portion of the compartment 6 is limited by a stop bar 10 which is provided with a recess 11 through which a microswitch 12 projects.

The bottom 7 of the compartment 6 is formed with a plurality of longitudinal gaps 14 through which driven carrier rollers 15 project with several millimeters clearance above the bottom. The rollers 15 are in connection with a not shown drive.

Between the inlet opening 5 and the first carrier roller 15, a controller drum 16 is provided in a further slot 14 provided in the bottom 7. The controller drum 16 has two axle journals 17 each of which rests on a spring element 18 and being fixed by a bracket 19 in all directions except the one directed to the spring element 18. As can be seen from FIG. 1, the spring element 18 has the shape of a bent leaf spring and includes one end fixed to the compartment bottom 7 and another end provided with a lug 18a which is arranged in the resting position above the U-shaped cut-out of a light barrier 20. In the same manner, the other side of the drum 16 is supported by a spring element 18 which cooperates with a light barrier 20. Between the controller drum 16 and the inlet opening 5, there is formed a further slot 21 in the compartment bottom 7 in which a slide 22 is lowered which is guided in lateral grooves 21a and can be lifted by not shown means behind the input opening 5. Through the slide 22, the input opening 5 can be closed in a light-tight manner.

It is to be noted that, for reasons for simplicity, FIG. 1 omits the illustration of several devices such as cassette sensing means, opening means and the means for removing and loading a film, which are also located in the compartment.

Figure 2:
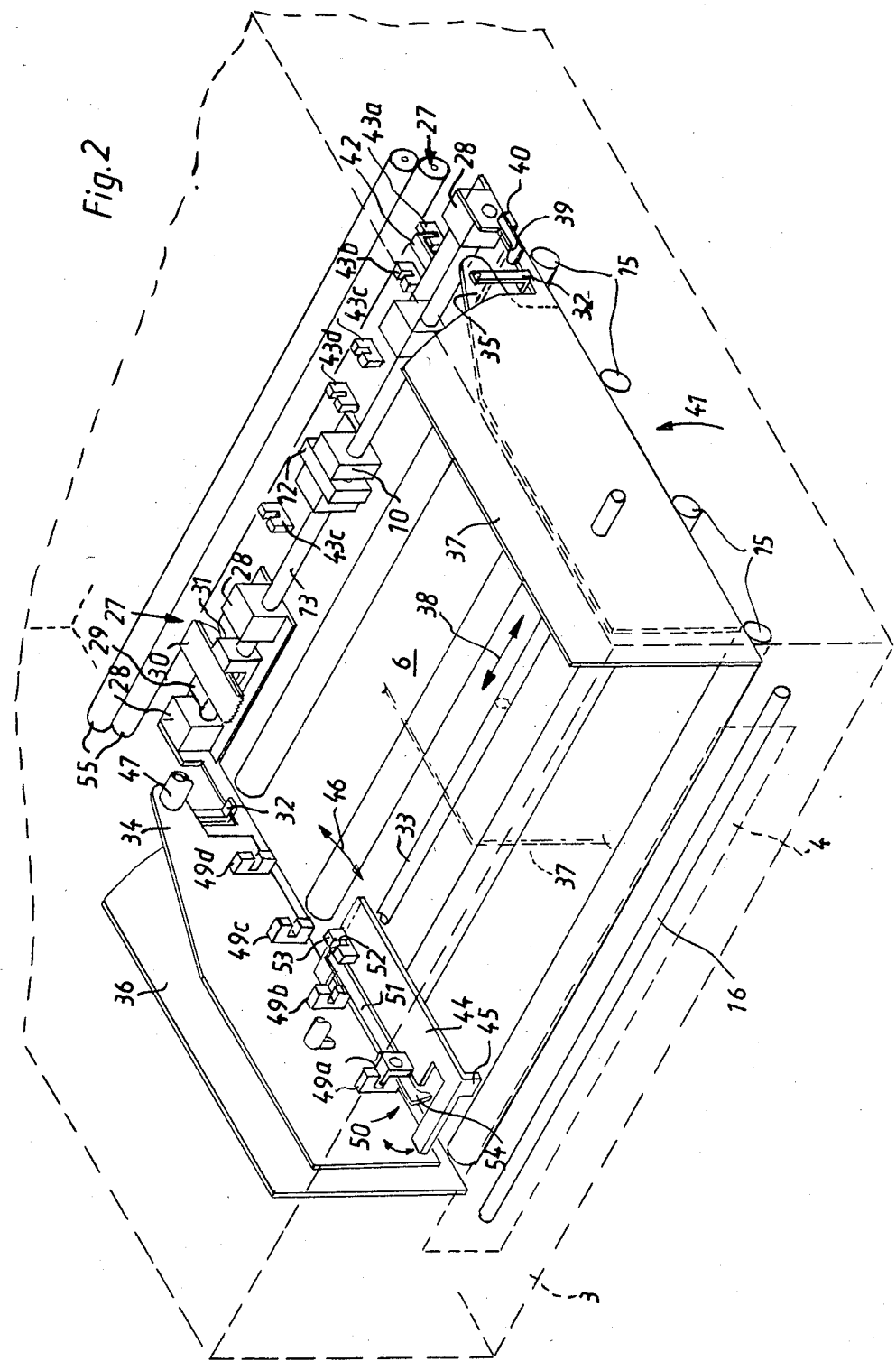
FIG. 2 is a schematic view of the cassette feeding station according to FIG. 1, illustrating the sensing means for identifying the size of a cassette, in perspective view.

FIG. 2 primarily illustrates in a different perspective view those elements which are essentially provided for identifying the size of the introduced cassette. Those parts already described with respect to FIG. 1 are denoted in FIG. 2 by the same reference numerals. It is further to be noted that those parts which are provided in the compartment but do not have any relevance for the present invention are omitted.

Opposite to the input recess 4, the switch 12 is provided which is fixed to a bar 13. On both sides of the bar 13, an unlocking device 27 is arranged, of which only one is completely illustrated. The unlocking device 27 has two blocks 28 connected with each other and has a U-shaped bearing 29, arranged between the blocks 28 and movably arranged on the bar 13 between the shanks of the U-shaped bearing 29, a rocker 30 is supported which is provided with a corrugation at the side facing the cassette. Beneath the rocker 30, a slidable wedge 31 is arranged between the blocks 28. The wedge 31 cooperates with an inclined face of the rocker 30 in such a manner that the rocker 30 can be pivoted counterclockwise against a not shown spring. Consequently, the corrugation of the rocker 30 can be engaged with a respective corrugation provided in the locking slide of the cassette. As soon as this engagement has occurred, the bearing 29 is moved along the bar 13 for unlocking the cassette.

For opening and lifting the cover of the cassette, each side of the compartment 6 is provided with a hook 32 which engages a respective recess of the cassette below the cover 23. One of the hooks 32 is attached to a pivot plate 34 which is pivotable around an axle 33 extending parallel to the controller drum 16. The opposing hook 32 is fastened to a slide plate 35 which is pivotable around the axle 33 and is slidable in direction towards the pivot plate 34 along the carrier rollers 15. The connection between the axle 33 and the plate 35 is provided in such a manner that the plate 35 can slide along the axle 33 on the one hand, and upon a rotational movement of the axle can be pivoted on the other hand.

Arranged parallel to both plates 34 and 35, wall plates 36, 37 are arranged which are connected to the respective unlocking device 27 and through which the axle 33 is guided. Moreover, the wall plates 36, 37 are guided by not shown means for respective movements along the bottom, as will be described hereinbelow.

The wall plate 37 cooperates with the slide plates 35 in such a manner that both can be moved along the bar 13. Together with the slide plate 35 and the wall plate 37, the unlocking device 27 is slid in direction of arrow 38, thereby taking into consideration the different sizes of the cassettes.

As sensing pin 39 is arranged at the wall plate 37 in a recess in the vicinity of the hook 32, which pin 39 cooperates with a microswitch 40. When a cassette is inserted, the sensing pin 39 engages into a specific recess 67 of the cassette and thus identifies the correct position relative to above and below and the front edge and back edge of the cassette.

The identification of the size of the cassette is obtained by means which are described hereinbelow. The light plate 35, the wall plate 37 and the unlocking device 27 are parts of a sliding arrangement 41 which further is provided with a lug 42 at a geometrically suitable location, which lug 42 can be moved in direction of arrow 38 as well. Along this moving path of the lug 42, a plurality of light barriers 43a-43e are arranged at certain locations. Each of these light barriers 43a-43e is so arranged that each location corresponds to a concrete size of a cassette length. This means that the lug 42, when cooperating for example with the light barrier 43c, represents a concrete size of a known cassette length which, however, may have several widths.

After having described the identification of the cassette length or the X-identification, the identification of the cassette width or Y-identification will be described. Cooperating with the fixed and only pivotable plate 34 is a sensing unit 44 which consists essentially of a horizontally arranged plate 44a and a measuring hook 45 depending vertically from the plate 44a. The sensing unit 44 is movable by not shown means relative to the plate 34 in feed or discharge direction 46 of the cassette and, moreover, is arranged pivotbable at a small angle by not shown means about an axis 47 extending parallel to the controller drum 16. The sensing unit 44 is also provided with a lug 48 which passes on the sliding path of the sensing unit 44 in direction 46 several light barriers 49a-49d arranged to the plate 34.

The sensing unit 44 is further provided with a film sensor 50 which has a pivoted lever 51 whose one end 52 can pass a light barrier 53 and whose other end is developed as a tip 54 which is moved counterclockwise by a not shown spring.

Arranged parallel to the bar 13, a transport roller pair 55 is arranged outside the compartment 6, the purpose of which will be described hereinbelow.

Figure 4:
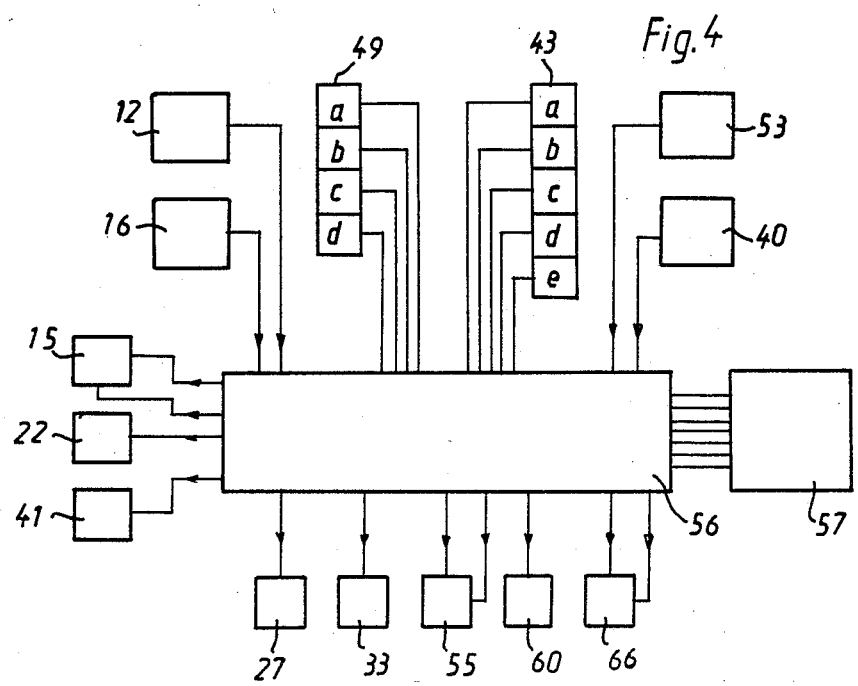
FIG. 4 is a block diagram illustrating the electrical connection of sensing means according to FIGS. 1-3.

With reference to FIG. 4, the mode of operation of the arrangement as shown in FIG. 2 will be described.

When a cassette 23 is introduced through the opening 4 into the compartment 6, the controller drum 16 is actuated. Upon actuation of the controller drum 16, the not shown drive for the carrier rollers 15 is switched on, so that the rollers 15 rotate in the direction such that the cassette is moved towards the bar 13. As soon as the switch 12 arranged on the bar 13 is actuated, the drive for the rollers 15 is switched off. In this position, the controller drum 16 should also be turned off. In case, however, the controller drum 16 is still actuated, then this means that a too large cassette or too large element has been introduced into the compartment 6, and thus does not represent a known size. This connection between the individual sensing and feeling elements is provided and checked in a computer 56. Consequently, when the switch 12 and the controller drum 16 are actuated, the drive of the carrier rollers 15 is reversed by the computer and the cassette is discharged from the compartment 6. In case, however, only the switch 12 is actuated, then the drive of the carrier roller 15 is switched off, and the slide gate lid 22 is closed, and the not shown drive for the sliding arrangement 41 is initiated. Due to the movement of the slide plate 35 in direction 38, the cassette is moved towards the wall 34 until it rests thereagainst and is arranged below the light barriers 49a–49d. In this end position of the slide plate 35, the lug 42 is either in one of the light barriers 43 or not. In case the lug 42 is not in engagement with one of the light barriers 43a–43e, the computer 56 identifies an "unknown size" and consequently actuates the elements 41, 22, 15 in the mentioned sequence with reverse drive, for discharging the cassette. In case, however, the lug 42 is in engagement with one of the light barriers 43a–43e, the respective X value, which corresponds to a certain length of the cassette, is compared with a value as stored in a memory 57.

Simultaneously with the sliding movement of the slide plate 35, also the sensing pin 39 is inserted into the cassette in case re-sensing pin 39 can engage in a respective recess 67 of the cassette 23, then, the correct position of the cassette 23 in the compartment 6 is confirmed, and the measurement of the size of the cassette is performed in the mentioned manner. In case, however, the cassette is positioned in an incorrect way, for example such that the cover faces the bottom or the rearward end of the cassette has been introduced first, then the sensing pin 39 is pressed outwardly and actuates the microswitch 40. This is registered by the computer, which then triggers the above mentioned step for discharging the cassette.

Immediately following the sliding movement of the unit 41, also the sensing unit 44 is initiated, which pivots counterclockwise around the axis 47 so that the hook 45 is pivoted into the area of forward movement of the cassette. Then, the drive unit 44 is moved in direction 46 towards the cassette until the hook 45 abuts the rear side of the cassette. Consequently, the width of the cassette is determined. In case the lug 48 connected to the sensing unit 44 is located in one of the light barriers 49a–49d, a respective size of the cassette is recognized and transmitted to the memory 57. Otherwise, if the lug 48 is located between the light barriers, an "impossible size" is determined and the cassette is discharged as already described.

In the memory 57, the recognized X and Y values are compared with the stored size values and it is determined whether the size corresponding to the obtained values does exist.

The present apparatus is suitable for a number of cassettes and film sizes. However, since in the storage magazines, only five or six film sizes can be stored; the computer 56 can additionally check whether the determined size is available in the storage magazines for reloading. If this is not the case, the cassette will not necessarily be discharged, but the apparatus indicates to the operator the absence of the required film. It is certainly conceivable that the cassette contains a film which merely should be removed. In this case, the operator can push a key at the input desk which triggers the removal of the cassette.

The film sensor which determines the loading state of a cassette by means of the tip 54 can indicate in the same manner whether a film is located in the cassette. If this is not the case, this information is transmitted to the operator, so that a key can be pushed for loading the cassette.

Apart from these special cases, the usual process will be described after the correct size of the cassette has been determined. At first, the unlocking device 27 is triggered, so that the rocker 30 is brought in engagement with the locking slide of the cassette, and then the device 27 is moved towards the center of the bar 13 by not shown means. The rockers 30 remain in this position and keep the cassette bottom at the housing bottom. Then, the axle 33 is rotated, thereby pivoting the plate 34, 35, so that the hooks 32 lift the cassette cover. After loading and unloading, the cassette is locked in reverse manner, and the process for discharging the cassette is triggered as already described.

Figure 3:
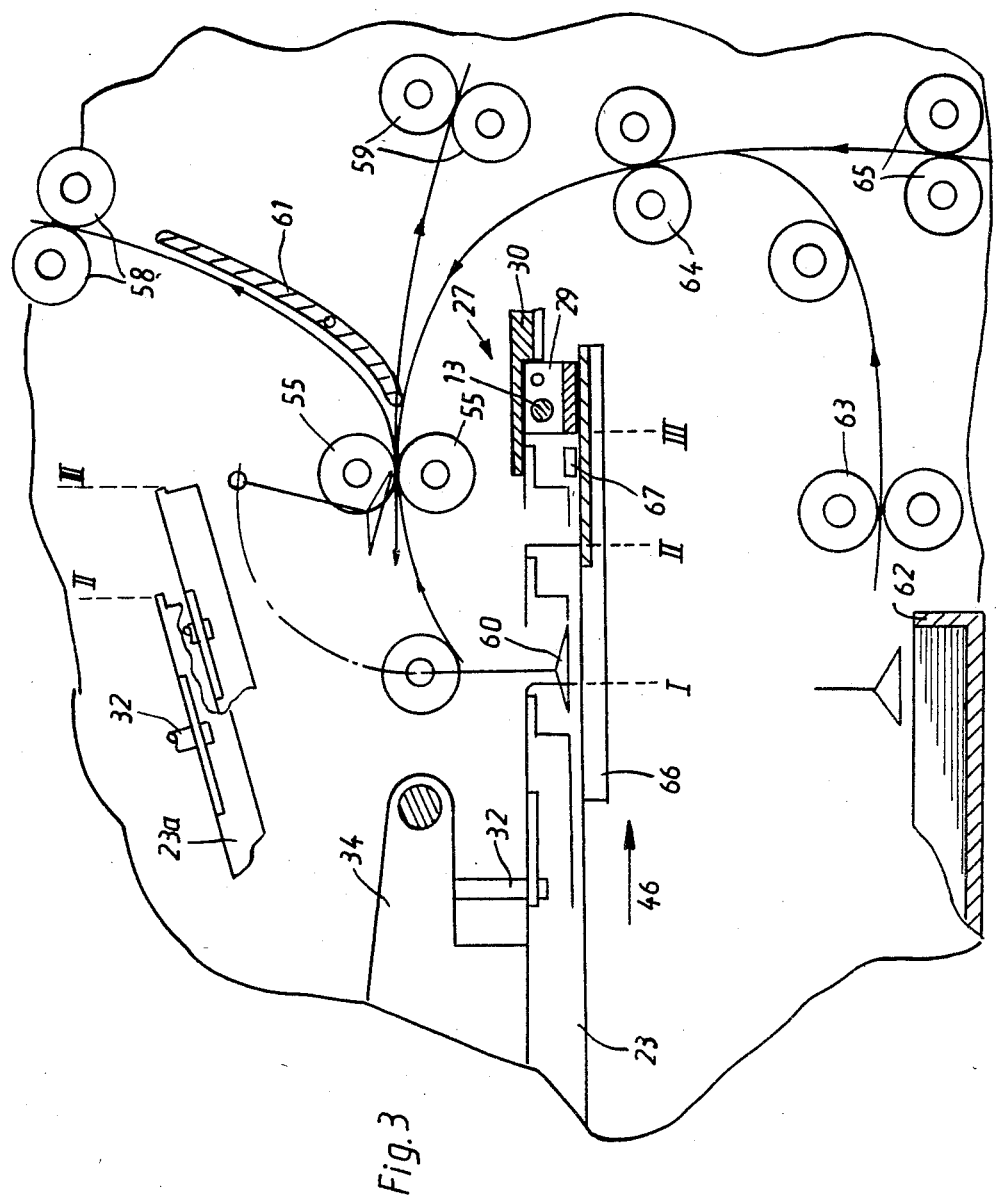
FIG. 3 is a cross-sectional view of a loading and removing station.

FIG. 3 illustrates in an enlarged scale the removal and loading of a film according to the invention. It is to be noted that the bottom and cover of the cassette are only partly shown, and that the sectional view is provided through one rocker 30. In the left part of FIG. 3, the front portion of the closed cassette 23 is shown, having a front end abutting the not shown switch 12 in a position I. In this position, the determination of the size is performed. After termination of this process, the unlocking is caused by the rockers 30, and the cassette cover 23a is lifted by the hooks 32. The lifting step is supported by moving the cassette towards the loading and unloading roller pair 55 in direction of arrow 46. This movement is carried out by a drive 66 which moves the cassette located between the plates 35, 34 together with the wall plates 36, 37 and the entire mechanism arranged on the bar 13 in direction 46 relative to the rollers 55. Consequently, a position II is obtained. In this position, the cover 23a is also in the position characterized by II, and a suction device 60 engages the cassette 23 and removes in a known manner the film sheet contained therein.

The suction device 60 transfers this sheet via a guide roller 73 to the transport roller pair 65, which is driven in a first direction and transfers the sheet depending on the position of a diverter 60 either to a roller pair 58 (illustration shown) leading to a storage or directly to a roller pair 59 leading to a developing machine. In correspondence to the size determined in the computer 56, a new sheet is taken from the respective storage magazine 62 and transferred to transport roller pairs 63, 64 via a guide roller 74.

After the exposed film sheet is removed from the cassette and has passed the roller pair 55, the rotational movement of the roller pair 55 is reversed, and the cassette 23 is shifted with the side walls and the bar 13 into the position III by the drive or transport elements 66. As can be seen from FIG. 3, in the position III, the rocker 30 still presses on the cassette bottom and holds the cassette. In this position, the new sheet taken from the storage magazine 62 is inserted into the cassette by moving the forward edge of the sheet along the cassette bottom towards the hinged portion between bottom and cover of the cassette, wherein eventually the rear sheet end drops from the lower transport roller 55 into the interior of the cassette.

The roller pair 55 indicates that the new film sheet can also be provided by a different storage magazine.

Through the provision of different positions of the cassette, it is achieved that, in position II, the suction device can relatively easily be engaged with the cassette, which otherwise would be difficult in position III. In the position III, the film sheet drops exactly into the cassette. In position II, there would be the danger that the sheet would get caught over the cassette edge.

After insertion of the film, the direction of the drive or transport elements 66 is reversed, so that the cassette is moved from position II to position I, in which the locking of the cover 23a is performed.

Figure 5:
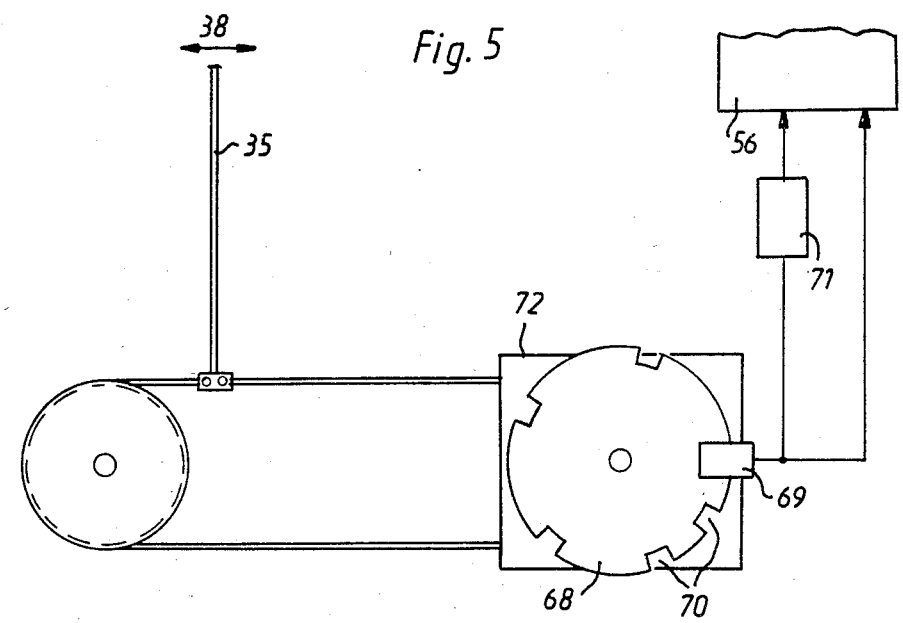
FIG. 5 is a schematic view of a second embodiment of the sensing means.

According to a modification of the invention, a disk 68 is provided instead of the row of light barriers 43a–43e, 49a–49d. The disk 68 is in association with a drive 72 for the movement of a sensing member. In FIG. 5, the pivot plate 35 is illustrated as the sensing member, which is fixedly connected to a belt drive of the drive 72. Arranged on the disk 68 at predetermined distances are indexes 70 which can be sensed by a light barrier 69. The light barrier 69 is in association with a counter 71 whose output leads to the computer 56.

During operation, the counter 71 counts the passing indexes 70 in the light barrier 69. As can be seen from FIG. 5, the light barrier 69 is also directly connected to the computer 56 in order to determine an index 70 within the light barrier 69 at the termination of the movement of the pivot plate 35. Consequently, concrete positions of the sensing member can be determined in the same manner as described above. Certainly, the sensing units 44 can be developed in the same manner.

It will be understood that each of the elements described above, or two or more together, may also find a useful application in other types of apparatus for loading and unloading a film cassette differing from the types described above.

While the invention has been illustrated and described as embodied in an apparatus for loading and unloading a film cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Apparatus for loading and unloading a film cassette, in particular a X-ray cassette, comprising:
    a housing defining a compartment and including a front face having an opening to the compartment through which opening the cassette is introduced;
    means for transporting the cassette into the compartment and for discharging the cassette from the compartment;
    first means for identifying the length of the cassette for providing a corresponding actual value thereof;
    second means for identifying the width of the cassette for providing a corresponding actual value thereof;
    means for comparing the actual values provided by the first and second identifying means with stored nominal values of concrete sizes of cassettes; and
    means for removing the film from the cassette and loading the cassette with a new film in dependence upon the comparison provided by the comparing means, the first identifying means including a controller drum extending parallel to the opening within the compartment and being actuated upon introduction of the cassette through the opening, the controller drum remaining in the actuated state when the inserted cassette is of a too long size thereby causing the comparing means to reverse the transporting means for discharging the cassette, said housing accommodating a side plate arranged perpendicularly to the opening and extending into the compartment, the first identifying means further including a shifting device actuated when the controller drum is turned off and having a slide member movable transversely to the insertion direction of the cassette towards the side plate for positioning the cassette, a first plurality of light barriers arranged parallel to the transverse movement of the slide member, each of the light barriers being arranged at a location corresponding to a predetermined length of the cassette, and a first lug movable with the cassette when the slide member moves the cassette towards the side plate, and cooperating with the first plurality of light barriers so as to determine whether or not the cassette corresponds to a predetermined length.

2. Apparatus as defined in claim 1; and further comprising third means for identifying the position of the cassette within the compartment.

3. Apparatus as defined in claim 2, wherein the comparing means includes a computer, and a memory storing the concrete sizes of the cassettes and being in association with the computer, the computer providing a signal "incorrect size" when determining that the actual value does not correspond to one of the nominal values as contained in the memory.

4. Apparatus as defined in claim 3; and further comprising a film sensing device for determining whether or not the cassette contains a film, wherein the film sensing device transmits a signal to the computer when a film is absent from the cassette which computer then provides an alarm and/or stop signal.

5. Apparatus as defined in claim 4, wherein the film sensing device includes a pivotable lever having one end and another end developed as a tip, and a light barrier cooperating with the end of the pivotable lever.

6. Apparatus as defined in claim 3, wherein the shifting device, the light-tight closing means and the transporting means are brought into reverse drive when the computer determines the signal "incorrect size".

7. Apparatus as defined in claim 3, wherein the third identifying means includes a tracer pin cooperating with a predetermined recess of the cassette for predetermining whether or not the cassette has a correct position within the compartment wherein the computer causes the discharge of the cassette when the tracer pin is not engageable with the recess.

8. Apparatus as defined in claim 1; and further comprising means for light-tight closing of the compartment of the housing when the cassettes is arranged within the compartment.

9. Apparatus as defined in claim 1, wherein the second identifying means includes a sensing unit moveable in insertion direction of the cassette and being pivotable in and out of the path of insertion movement of the cassette, a second plurality of light barriers arranged along the insertion direction of the cassette, each of the light barriers being arranged at a location corresponding to a predetermined width of the cassette, and a second lug arranged on the sensing unit and being movable therewith, the second lug cooperating with the second plurality of light barriers so as to determine whether or not the cassette is of predetermined width.

10. Apparatus as defined in claim 1, wherein the second identifying means includes a sensing unit movable in insertion direction of the cassette and being pivotable in and out of the path of insertion movement of the cassette, a second index disk provided with index marks arranged at predetermined locations on the disk and being rotatable in correspondance to the movement of the sensing unit, a light barrier cooperating with the second index disk, and a counter for counting the passed index marks as registered by the light barrier when the sensing unit is moved for identifying the width of the cassette.

11. Apparatus for loading and unloading a film cassette, in particular a X-ray cassette, comprising:
 a housing defining a compartment and including a front face having an opening to the compartment through which opening the cassette is introduced;
 means for transporting the cassette into the compartment and for discharging the cassette from the compartment;
 first means for identifying the length of the cassette for providing a corresponding actual value thereof;
 second means for identifying the width of the cassette for providing a corresponding actual value thereof;
 means for comparing the actual values provided by the first and second identifying means with stored nominal values of concrete sizes of cassettes;
 means for removing the film from the cassette and loading the cassette with a new film in dependence upon the comparison provided by the comparing means;
 third means for identifying the position of the cassette within the compartment, said comparing means including a computer, and a memory storing the concrete sizes of the cassettes and being in association with the computer, the computer providing a signal "incorrect size" when determining that the actual value does not correspond to one of the nominal values as contained in the memory, said first identifying means including a controller drum extending parallel to the opening within the compartment and being actuated upon introduction of the cassette through the opening, the controller drum remaining in the actuated state when the inserted cassette is of a too long size thereby causing the comparing means to reverse the transporting means for discharging the cassette; and
 means for light-tight closing of the compartment of the housing when the cassettes is arranged within the compartment, said first identifying means means further including a shifting device actuated when the controller drum is turned off, the shifting device, the light-tight closing means and the transporting means being brought into a reverse drive when the computer determines the signal "incorrect size".

12. Apparatus as defined in claim 11, wherein the housing accomodates a side plate arranged perpendicularly to the opening and extending into the compartment, said shifting device having a slide member movable transversely to the insertion direction of the cassette towards the side plate for positioning the cassette, a first plurality of light barriers arranged parallel to the transverse movement of the slide member, each of the light barriers being arranged at a location corresponding to a predetermined length of the cassette, and a first lug movable with the cassette when the slide member moves the cassette towards the side plate, and cooperating with the first plurality of light barriers so as to determine whether or not the cassette corresponds to a predetermined length.

13. Apparatus as defined in claim 11, whereby the housing accomodates a side plate arranged perpendicularly to the opening and extending into the compartment, the
 shifting device having a slide member movable transversely to the insertion direction of the cassette towards the side plate for positioning the cassette, a first index disk provided with index marks arranged at predetermined locations on the disk and being rotatable in correspondence to the transverse movement of the slide member, a light barrier cooperating with the index disk, and a counter for counting the passed index marks as registered by the light barrier when the slide member is transversely moved towards the side plate for identifying the length of the cassette.

* * * * *